Figure 1:
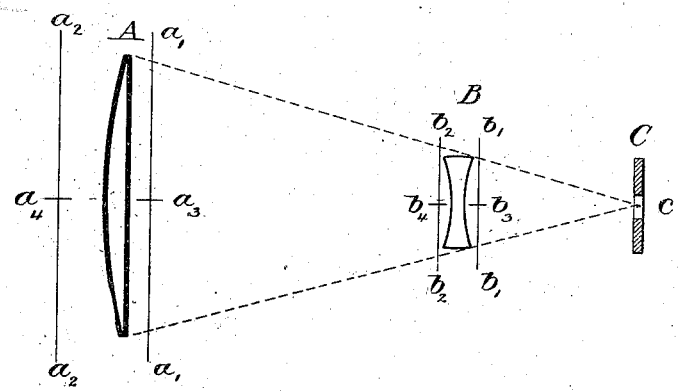

(Model.)

V. COLVIN.
TELESCOPE.

No. 547,243.  Patented Oct. 1, 1895.

2 Sheets—Sheet 1.

Witnesses:
Geo. D. Hill
Mills Blake

Inventor:
Verplanck Colvin (Model.)   V. COLVIN.   2 Sheets—Sheet 2.
TELESCOPE.
No. 547,243.   Patented Oct. 1, 1895.
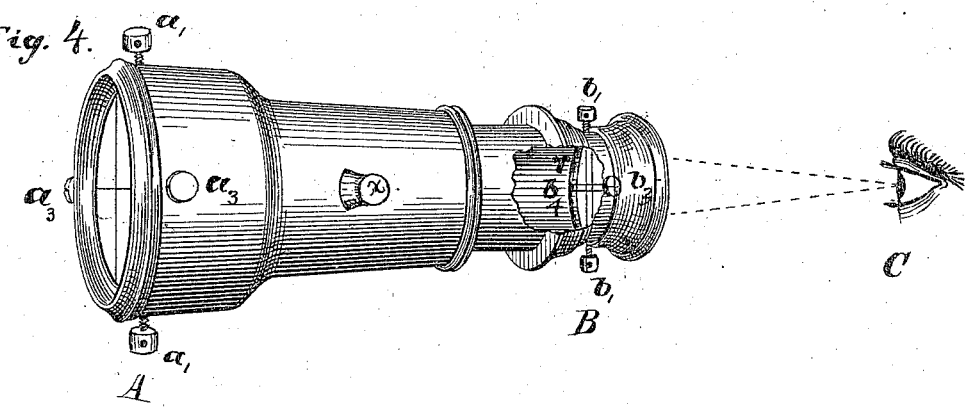
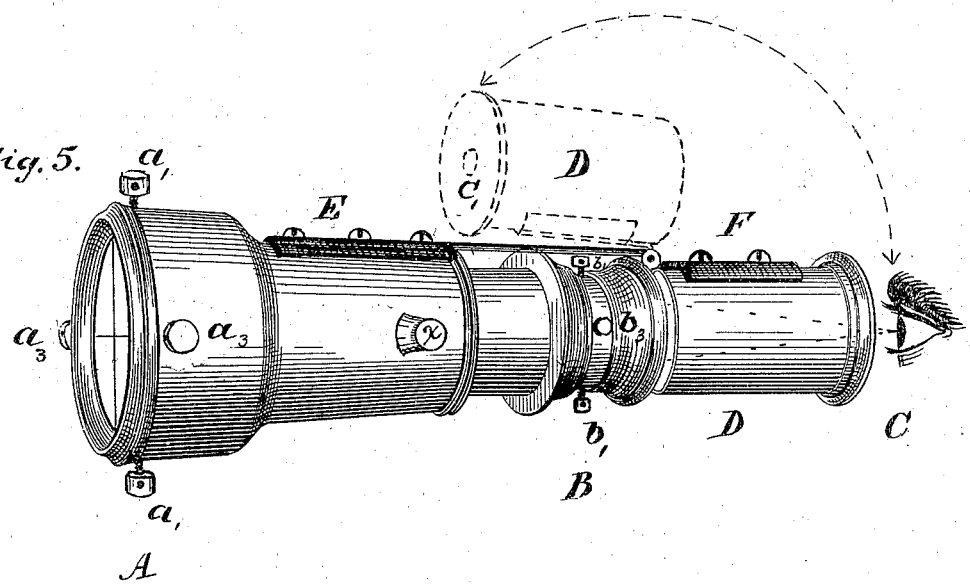
WITNESSES:
Geo. D. Hill
Mills Blake
INVENTOR
Verplanck Colvin

UNITED STATES PATENT OFFICE.

VERPLANCK COLVIN, OF ALBANY, NEW YORK.

TELESCOPE.

SPECIFICATION forming part of Letters Patent No. 547,243, dated October 1, 1895.

Application filed November 6, 1893. Serial No. 490,191. (Model.)

*To all whom it may concern:*

Be it known that I, VERPLANCK COLVIN, a citizen of the United States, residing at Albany, in the county of Albany and State of New York, have invented a new and useful improvement in accessory mechanisms for telescopes of the class known as "Galilean telescopes" and other similar or kindred telescopes, being a new arrangement of the internal reference-measuring mechanisms of the ordinary or common technical or professional instrument telescopes, by a modification and adaptation of such mechanisms fitting them for use in Galilean telescopes or the special class of telescopes mentioned; and I do hereby disclose my invention in the following specification.

My invention relates to the improvement of the reference-measuring (which may be called "internal accessory") parts or apparatus of technical, professional, or observing telescopes and is adapted for use in such telescopes as are used or may be desired to be used in astronomy, navigation, surveying, engineering, architecture, or other sciences or arts, as apparatus aiding or to aid in accurate reference measurements of angles, distances, or dimensions, as cross-wires, collimation-pieces, telemeter-pieces, micrometer pieces or parts, unfilar or bifilar arrangements, lines, marks, or sights in telescopes, especially for the form known as the "Galilean telescope," or those telescopes that have any arrangement of lenses similar to the Galilean telescope or have a double-convex or plano-convex object-glass and double-concave or plano-concave eyeglass, or telescopes where the rear independent focusing-point of the object-glass is in any degree in the rear of the eyeglass, or for other suitable forms of telescopes.

The object of my improvement is to facilitate in Galilean telescopes (and the similar or kindred telescopes above indicated) the use of the various kinds of reference-measuring mechanisms mentioned (for collimation, telemeter, micrometer, or other purposes) by a modification of the common single-placed mechanisms into duplicate or multiple complementary-spaced parts necessary to adapt such mechanisms to Galilean and the similar telescopes for which my invention is designed.

In the common form of telescopes the focusing-point of the object-glass is located within the tube of the telescope between the object-glass and eyeglass. Hence the reference-measuring mechanism (cross-wires, collimation, telemeter, micrometer, or similar accessory part) is located at or near this single point within the telescope-tube and is here adjusted to the optical axis of the telescope and is sharply defined in the telescopic field under the magnifying power of the eyeglass.

In the Galilean and kindred telescopes for which my invention is intended the common arrangement of interior reference-measuring mechanisms last-above described is not, for optical reasons, practicable. In this class of telescopes the point where the rays of light passing the object-glass come (independently) to a focus is in the rear of the eyeglass, and under these conditions the common single-placed arrangement of internal reference-measuring mechanisms would not be accurate or useful.

By my invention the common single-piece cross-wire, collimation, micrometer, telemeter, mark or sight is replaced in Galilean night telescopes or panergetic glasses and kindred telescopes by parts which, though they may be similar in aspect to the common forms, differ in being of duplicated or multiple complementary parts, spaced or separated, instead of being set close together, and arranged so as to be visually interposed or superimposed and to serve all the purposes in Galilean and kindred telescopes that the common forms of reference-measuring mechanisms serve in the forms of telescopes to which they are now attached.

I have found that in Galilean and kindred forms of telescopes, when duplicate cross-wires or other objects are secured in the field of view of such a telescope, with one cross-wire or object at or near the object-glass and the other at or near the eyeglass, and both of these viewed from a point in rear of the eyeglass where the eye of an observer has clear vision of both of the mechanisms at object-glass and eyeglass, there results a perfect visibility of all these separated mechanisms, while a clear view is also had of the distant objects sought to be observed or measured to with aid of these accessory mechanisms. I have also found that when the eye of the observer is placed close to the eyeglass of a telescope, with the cross-wires or other mechanisms at object-glass and eyeglass, these mechanisms practically disappear from view and leave the observer using a Galilean telescope or kindred telescope thus provided with reference-measuring accessories an almost clear field of view, but little blurred by the presence of the mechanisms. This peculiar action of the Galilean and kindred telescopes is the basis of my invention, suggesting the substitution of multiple cross-wires or collimation marks, &c., as a substitute for the single-part mechanisms now used in the more common forms of observing-telescopes. To effect this adaptation of such mechanisms to the Galilean and kindred telescopes I proceed as follows: I construct any form of such mechanisms desired by making duplicate, multiple, or supplementary parts or pieces, with complementary parts, and place one part of the mechanism (cross-wire, collimation-piece, micrometer-piece, telemeter-piece, unifilar, bifilar lines, marks, or sights of any useful form) in front or behind, at, on, in, near, or convenient to the object-glass of such telescope. I also place a complementary piece or part of my mechanism, of any usual form, in front or behind, at, on, in, near, or convenient to the eyeglass of the telescopes. The internal accessory reference-measuring mechanism of the telescope is thus divided into multiple complementary parts connected by tube or tubes, plates or rods, and held or adjusted in rings or frames made secure by means of screws, slides, wedges, hinges, or soldering. The centers of these parts are fixed or adjusted in their proper positions in or near the optical axis of the telescope by any device, and are viewed, when used in observing, from a point or place in the rear of the eyeglass where the eye has good vision of these mechanisms and of the objects in the field of view of telescope, the finding of this rear point or place for the eye of the observer being facilitated by the addition of a movable extension-tube to the rear of eyeglass, with an aperture in end of tube some distance in rear of the eyeglass in the line of the optical axes of the telescope. This rear extension-tube may not be needed by skilled observers, who can find this rear place for the eye by trial. The tube, being made movable or removable, can be taken off by such observers.

A telescope with reference mechanism thus constructed is used as follows: Thus for a cross-wire collimation mechanism the intersections of the object-glass wires duly adjusted to the center of the optical axis of telescope are brought to coincide with the eyeglass complementary wires or included by bifilar threads, wires, or their equivalent, or vice versa. Thus each part is visually superimposed or includes the other part, or is included by it, either part acting as the complement or supplement to the other, and the centers of both parts adjusted to the optical axis of the telescope. The direction of their centers indicates the true central collimation line of the telescope and (mounted on a theodolite, &c.) can be used for reference in measuring angles by holding the eye back in rear of the eyeglass, where clear vision is simultaneously had of the essential parts of the mechanism and of the objects to be observed. Telemeter and micrometer pieces are similarly placed and, in part, (at least,) made so as to be visually superimposed, included or including the complementary parts, and thus secure a true direction or measurement in observing when desired.

When the instrument is used without the rear extension-tube and the eye is brought close to the eyeglass, the telescope may be employed as though no mechanism existed and a nearly clear field of view obtained for ordinary use.

In the drawings, Figure 1 shows a condensed vertical section of a Galilean telescope with the places or locations for the parts of the divided or complementary mechanisms of accessory, reference, or measuring apparatus (for collimation, micrometer, or telemeter purposes.) At A is shown a plano-convex object-glass. At B is a double-concave eyeglass. At C is shown part of the rear extension-tube of telescope and movable disk, with aperture in the same, set in the optical axis of the telescope produced backward. This rear tube is drawn back, or the eye of the observer is drawn back, until he has clear vision of the mechanism at B and A and of the object to be observed in the field of the telescope. In this figure suitable places for the front or object glass mechanism are indicated at A, $a'$, $a^2$, $a^3$, and $a^4$. Places convenient for complementary parts of the mechanism or eyeglass parts are indicated at B, $b'$, $b^2$, $b^3$, and $b^4$. At $c$ is shown the aperture in the movable or removable rear extension-tube C, which, when extended sufficiently back to suit the eye of the observer and give clear vision of the mechanism and field of view, is the place of the eye in observing.

Figure 2:
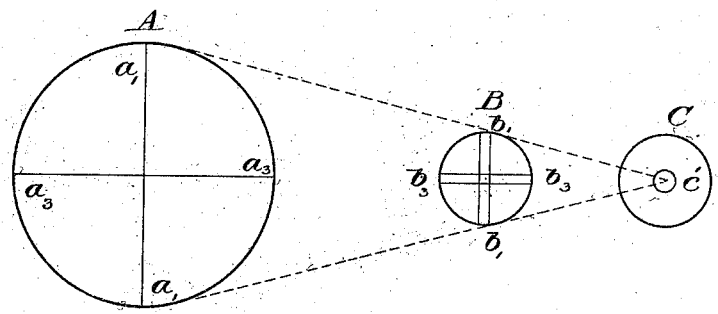

Fig. 2 only differs from Fig. 1 in having the object-glass, eyeglass, and rear extension-tube turned through ninety degrees of arc, so as to show the application of my invention to a collimation mechanism. At A, $a'$, and $a^3$ are shown the cross-wires for the front part of such a mechanism near the object-glass. At B $b'$ $b^3$ are shown complementary bifilar cross-wires near the eyeglass, arranged so that they may be used to optically include or inclose the image seen of the front piece or pieces or section of mechanism at A, near the object-glass.

Figure 3:
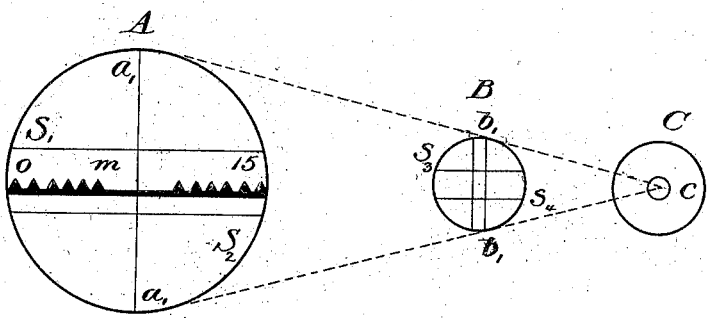

Fig. 3 is similar to Fig. 2, differing only in showing how my invention may be applied to a micrometer or telemeter apparatus. In this figure the pieces or parts A and $a'$ $a'$, with S' and S$^2$ and M arranged near the object-glass end of telescope, are centered by or adjusted to the separate pieces or parts at B, having the complementary lines or wires $b'$ $b'$ and $S^3$ $S^4$, by which any reference-measuring mechanism at A, such as shown at $m$, with divisions 0 to 15, &c., may be optically centered by visually interposing $a'$ $a'$ between $b'$ $b'$ and superimposing on $S'$ the line $S^3$ and the apparent image of the line $S^4$ upon or over the line $S^2$, all being viewed from the convenient distance in rear of the eyeglass at or beyond the aperture $c$—that is, to the rear of the movable extension-tube C.

Fig. 4 shows a perspective view of a Galilean telescope with a collimating cross-wire apparatus arranged in accordance with my invention. In this figure one side of the telescope is shown cut away near the eyeglass to show the ring $r$, carrying bifilar cross-wires adjusted or adjustable to the optical axis of the telescope by the capstan-headed screws near $b'$ $b^2$ $b^3$ $b^4$. At the object-glass end A in this figure are shown the capstan-headed screws near $a'$ $a'$ and $a^3$ $a^3$, which control, for purposes of adjustment, the position of the complementary cross-wires by means of another internal ring or frame. (Not shown.) In this figure also the pieces of mechanism at A and B are complementary or supplementary to each other, and the eye of the observer is shown withdrawn any convenient distance in rear of the eyeglass or the point C, wherever it may be found best located for clear vision of the mechanisms at A and B with the particular telescope used. At X is the approximate place for axis of this telescope.

Fig. 5 shows an external perspective view of a Galilean telescope arranged with a folding extension-tube D and with capstan-headed screws near $a'$ $a'$ and $a^3$ $a^3$ at object-glass place, and near $b'$ $b^3$, &c., at eyeglass place in telescope, to move or adjust the internal rings or frames carrying the complementary parts of the cross-wire collimation apparatus. The dotted outline of the movable extension-tube D shows one position of this tube when turned back, so that the eye can be approached to the eyeglass at B. In the figure the eye of the observer is shown withdrawn to a point in the rear of the extension-tube where clear vision is assumed to be had of the mechanisms at A and B. The extension-tube D can be made in any way and attached to the eyeglass end of the telescope B in any manner by a screw-thread or by friction-slide or, as shown in the drawings, made folding and attached by the frames E and F, which, in this case, are connected by a hinge.

In practical work with telescopes having longer focus object-glasses than those shown in model or proposed in the drawings the eye will generally be placed much farther in the rear of the eyeglass than is shown in the condensed or shortened form of telescope of my drawings or models. The models show in various ways in two Galilean telescopes how simple forms of internal reference apparatus for such and kindred or similar telescopes may be arranged in complementary parts or mechanisms at points convenient to object-glass and eyeglass, so as to effect the useful results desired.

In the figures and models explaining the methods of arranging such mechanisms in the necessary complementary parts similar letters of reference indicate similar places.

I claim as my invention—

1. In a Galilean, or any available telescope; a reference measuring, collimation or micrometer mechanism made and divided into complementary pairs of spaced or separated parts, wires or lines, or their equivalent; one part at or near the object-glass, and another part at or near the eye-glass, as set forth in the specification and explained by the drawings.

2. In a Galilean or any available telescope; the combination of a reference-measuring collimation or micrometer mechanism of one or more lines, wires, divided scales or their equivalents, placed at or near the object-glass, with a complementary or supplementary mechanism at or near the eye-glass, united by a tube, or its equivalent, extending from the objective to the eye-glass and to the eye-place in rear of eye-glass, as set forth in the specification and explained by the drawings.

3. In a Galilean or similar telescope; a mechanism for collimation, micrometer or reference-measuring purposes, constructed with duplicate parts, or parts made optically complementary to each other; one mechanism part, collimation piece or micrometer piece being adjusted at or near the object-glass, and the other supplementary part or piece being adjusted at or near the eye-glass; both parts placed and adjusted to be visible from the eye-place in rear of eye-glass, and to be invisible, or nearly invisible, with the eye close to eye-glass; as set forth in specification.

4. In a Galilean or similar telescope; a reference measuring mechanism of cross-wires, lines or their equivalents, one part placed at or near the object-glass and a supplementary part placed at or near the eye-glass, both parts connected by the tube of telescope, or its equivalent; and the eye-glass connected with the movable or removable extension tube, back of eye-glass, with its sighting aperture for vision of the mechanisms and field of view of telescope; as set forth in the specification.

5. In a Galilean or similar telescope; a reference measuring, collimation or micrometer mechanism having one part adjusted at or near the object-glass, as shown in drawings at A, $a'$ —$a^2$ —$a^3$ —$a^4$ —$s'$ —$s^2$ —$m$; and having another complementary part as shown in drawings at or near the eye-glass B, —$b'$ —$b^2$ —$b^3$ —$b^4$ —$s^3$ —$s^4$; connected with a movable or removable tube D (extending in rear of eye-glass) having a rear aperture $c'$; said mechanism being arranged for use in the manner set forth in the specification and shown in drawings.

6. A Galilean or similar telescope having collimation, micrometer, or reference measuring mechanisms, wires or lines so arranged that the said lines or mechanisms, and the image of the object observed or viewed through the telescope, may be clearly seen simultaneously, or that such image alone may be clearly seen.

VERPLANCK COLVIN.

Witnesses:
M. BLAKE,
GEO. D. HILL.